UNITED STATES PATENT OFFICE.

ARTHUR ADLER, OF VIENNA, AUSTRIA-HUNGARY, ASSIGNOR TO RUDOLF NEUFELD, OF VIENNA, AUSTRIA-HUNGARY.

METHOD OF MANUFACTURING ELASTIC MATERIAL.

No. 897,334.          Specification of Letters Patent.          Patented Sept. 1, 1908.

Application filed August 19, 1907. Serial No. 389,218.

*To all whom it may concern:*

Be it known that I, ARTHUR ADLER, a subject of the German Emperor, residing at Vienna XIV, Austria-Hungary, have invented a certain new and useful Improved Method of Manufacturing Elastic Material, of which the following is a specification.

A known process of manufacturing elastic masses or compositions consists in mixing glue with glycerin and chrome salts, more particularly bichromate of potash, said salts having the property of raising the melting point of the glue and rendering it insoluble when the mass has been acted on by light. The utility of these known compositions as substitutes for india-rubber and the like is very restricted owing to their inferior tensile strength, toughness and elasticity; articles manufactured of the said compositions are liable to break when repeatedly stretched or bent, and are deteriorated by dampness owing to the fact that moisture separates glycerin therefrom. These known compositions also have the disadvantage that in course of time they become harder and more brittle by reason of chemical action which takes place in the mass, and they gradually lose part of their elasticity. Moreover, in preparing the said compositions without admixture of water the difficulty arises that when the chrome salts have been added the melted mass becomes so stiff that it is impracticable to pour it in a moderately thin stream into a mold, and the mass cannot be re-melted after it has set, even if the attempt to do so is made soon after the setting.

The present invention provides a method of manufacturing elastic compositions containing chrome-salts and glue which possess, and permanently retain, the advantages of great tensile strength, toughness, elasticity, and capacity of resisting moisture, and which are also capable of being re-melted after they have been molded, at least during a period of several days after setting.

The invention consists in adding lead-plaster to a mixture of glue, glycerin and chrome-salts, with or without certain additional substances (as hereinafter mentioned) which are capable of imparting to the mass certain of the properties named, or of assisting the action of the lead-plaster.

It is well known that compositions of glue and glycerin lose a large part of their elasticity and pliability when chrome-salts are added thereto, and that a further loss of these properties takes place in course of time. By adding lead-plaster to the mass this undesirable change is prevented without interfering with the raising of the melting point and increase of insolubility produced by the addition of the chrome salts. The action of the latter with regard to the melting point and solubility also takes place in the presence of the lead-plaster, but in a milder form and at a slower rate. The addition of lead-plaster therefore has the effect that when the chrome-salts are added to the mass, prepared without the addition of water, the mass does not immediately become stiff, but can be poured in a thin stream into a mold. The presence of the lead-plaster also enables the mass to be re-melted and re-molded during a period of several days after it has set. The lead-plaster also prevents the removal of glycerin from the mass by the action of moisture, and permanently prevents the mass from becoming brittle and cracked.

In addition to lead-plaster certain substances may be added which are capable of imparting to the mass certain of the properties desired, or which are capable of assisting the action of the lead-plaster. For example, the tensile strength, toughness and elasticity are increased by adding adraganth vegetable fibers treated with acid, or gum resins, for example gum ammoniac, separately or mixed. Vegetable balsams, for example styrax, tolu balsam and copaiba balsam, render the mass tougher and more elastic, and act somewhat similarly to lead plaster inasmuch as they retard the action by which the mass is rendered infusible and insoluble. Moreover, they prevent the separation of glycerin by moisture.

An example of the manner in which the mass may be produced is as follows: Glue is softened in water and then melted in a water-bath. To 100 parts of this glue, from 100 to 150 parts of glycerin are added, and the mixture is heated in the water-bath until all the water has been removed from the mixture. Then the addition is made of from 2 to 5 parts of lead-plaster per 100 parts of glue. After intimately mixing the substances named, from 3 to 5 parts of bichromate of potash are added per 100 parts of glue. If adraganth, gum resins, vegetable balsams or water-glass are added, the proportions in which they are used does not exceed 5 parts per 100 parts of glue, and they are added before the chrome-salts. If vegetable fiber or cellulose (for example cotton) is used, the same may be loose or in the form of a fabric, and is dipped into acid before use, to make it tough and dense (parchment-like). If loose cotton fibers are used the proportion thereof may be from two to fifteen per cent. of the mass, and the cotton is previously treated with acid in the known manner and washed. It may be added to the mass immediately after the washing process, while still wet, the water being then removed by evaporation, or the cotton may be previously dried. In all cases the addition of the loose cotton is made before the addition of the chrome salt. If a fabric is used, it is always dried after being treated with acid and washed, and before being added to the mass, and the fabric is incorporated with the mass after the addition of the chromate, while the mass is still semi-liquid and soft, or it is pressed into the mass by means of rollers if the mass has already become harder. To obtain rapid and uniform exposure to light, more particularly in the case of large bodies, successive layers of the mass may be successively exposed, with light-reflecting layers interposed after each exposure.

What I claim as my invention and desire to secure by Letters Patent of the United States is:—

1. The method of manufacturing elastic chrome-glue compositions as substitutes for india rubber and the like, consisting in adding lead-plaster to the known basic mass of glue glycerin and chrome salts.

2. The method of manufacturing elastic chrome-glue compositions as substitutes for india rubber and the like, consisting in adding lead-plaster in combination with vegetable matters to the known basic mass of glue glycerin and chrome salts.

3. The method of manufacturing elastic chrome-glue compositions as substitutes for india rubber and the like, consisting in adding lead-plaster (in combination with adraganth, gum resins, vegetable balsams, water glass, and vegetable fibers treated with acid) to the known basic mass of glue glycerin and chrome salts.

In witness whereof I have signed this specification in the presence of two witnesses.

ARTHUR ADLER.

Witnesses:
HANS PAPPENHEIM,
ROBT. W. HEINGARTNER.